United States Patent [19]

Seidenberger

[11] 4,076,553
[45] Feb. 28, 1978

[54] SPILL CONTROL COMPOSITION AND USE THEREOF

[75] Inventor: James W. Seidenberger, Bethlehem, Pa.

[73] Assignee: J. T. Baker Chemical Company, Phillipsburg, N.J.

[21] Appl. No.: 761,888

[22] Filed: Jan. 24, 1977

[51] Int. Cl.$^2$ .................. B01J 23/06; B01J 23/80; B08B 7/00; B01J 35/02
[52] U.S. Cl. .................. 134/6; 252/473; 252/475; 252/477 R; 75/109; 204/27; 204/55 R; 428/605
[58] Field of Search ............ 252/473, 475, 477 R; 75/109; 134/6, 42; 204/27, 55 R; 428/605

[56] References Cited

U.S. PATENT DOCUMENTS

| 2,228,762 | 7/1942 | Winkler | 204/55 R |
| 3,476,552 | 11/1969 | Parks et al. | 75/101 R |

FOREIGN PATENT DOCUMENTS

| 542,440 | 1/1942 | United Kingdom | 428/605 |

Primary Examiner—W. J. Shine
Attorney, Agent, or Firm—George W. Rauchfuss, Jr.; Eugene O. Retter

[57] ABSTRACT

A spill of liquid elemental mercury is cleaned up by contacting the mercury with zinc coated metal wools which have been activated by immersion in an acid activator solution.

9 Claims, No Drawings

SPILL CONTROL COMPOSITION AND USE THEREOF

FIELD OF THE INVENTION

The present invention relates to an article of manufacture for collecting spilled liquid elemental mercury and to a process for collecting spilled liquid elemental mercury using said article of manufacture.

BACKGROUND OF THE INVENTION

The toxicity of mercury is such that the element should not be allowed to contaminate air and water. Spilled mercury is often the source of mercury poisoning because it is finely divided and produces a relatively large amount of mercury vapor. Moreover, collecting all the spilled mercury in any particular spill is extremely difficult because of the high surface tension and high density of liquid elemental mercury.

Heretofore, granulated active charcoal containing iodine has been considered to be the best means of removing mercury vapor. However, the absorption rate and capacity of iodine bearing carbon for mercury is relatively low. More recently it has been proposed to employ a water soluble silver salt impregnated on a solid carrier and containing sufficient moisture for speedy reaction of the silver salt with mercury. This latter method, however, is not without its disadvantages and is unduly costly and requires an undue reaction time.

Still more recently a significant advance in the art was made with the discovery of a composition that was capable of taking up elemental mercury at a relatively fast rate and at a cost not prohibitively expensive. Said composition, as disclosed in U.S. Pat. No. 3,975,298 issued Aug. 17, 1976 to J. T. Baker Chemical Company as the assignee of J. W. Seidenberger, comprises a composition composed of a granular metal, a metal powder and a non-hydroscopic solid acid. This novel composition has not, however, been entirely useful or practical in all situations, such as, for example, where the liquid mercury has been spilled on vertical or irregular surfaces, that is, other than on smooth horizontal surfaces. Moreover, physical removal of the resulting paste from the spill area has not been entirely satisfactory and the use of the composition of said patent can result in further contamination of the spill area by contamination thereof with the metal powder or granules. Another disadvantage is that the resulting paste, even if recovered from the spill area does not lend itself to easy reclamation of the liquid mercury from the paste. In fact, recovery of the liquid mercury is essentially impossible or extremely impossible in most instances.

There is, therefore, a need for a method whereby spilled liquid elemental mercury can be collected and the problems mentioned in the preceding paragraph eliminated or substantially reduced.

SUMMARY OF THE INVENTION

It has now been found that metal wools, such as, for example, steel wool, which has been plated with zinc are ideally suited for use in cleaning up spilled liquid elemental mercury. In use, the zinc plated metal wool is first activated by immersion in a suitable acidic activator solution.

DETAILED DESCRIPTION OF THE INVENTION

The novel article of manufacture useful for the purpose of this invention comprises a metal wood which has been plated with zinc. Metal wools, which are filamentous masses of metal shavings and shreds, are well known abrasive agents. Among the metal wools that may be plated with zinc for use in this invention there may be mentioned for example, steel wool, bronze/cooper wool, stainless steel wool and various precious metal wools such as platinum, gold and the like. The preferred metal wool for use in the invention is the generally available steel wool.

The metal wool will be plated with zinc in an amount of from about 0.5% or more by weight, preferably from about 0.5% up to about 10% by weight or more. While amounts of less than about 0.5% by weight of zinc plating can be employed, lesser amounts are generally less desirable since the acid activator solution then tends to dissolve the zinc metal from the metal wool.

Metal wools will be plated with the appropriate amount of zinc by use of a zinc cyanide electroplating bath of the following typical composition:

|  | g/l |
| --- | --- |
| zinc cyanide | 60–82 |
| sodium cyanide | 19–64 |
| sodium hydroxide | 75–112 | at a temperature of from 82° to 100° F. with the current density of 10 to 50 amps/sq. ft. using anodes of high purity zinc. Immersion times to provide the required plating are generally from about 0.5 to 5 minutes at from 3.5–4.5 volts (25–35 amps) for a 7 × 17 inches metal wool pad.

Although any grade of metal wool is operable in this invention it has been found that a steel wool, grade No. 3 manufactured by American Steel Wool Mfg. Co. is especially useful when plated with about 2% by weight of zinc.

When employing the zinc plated metal wool to collect spilled liquid elemental mercury the zinc plated metal wool is first activated by immersion in a solution of an activator acid. It has been found in general that moderately strong organic acids and dilute mineral acid solutions will activate the zinc plated wool to varying degrees. There may be mentioned succinic, tartaric, ascorbic, fumaric, malic, oxalic, adipic, sulfamic, and citric acid as especially desirable operable acids with citric and sulfamic acids being especially preferred for health, performance and economic reasons. The activator acid solutions generally contain from about 0.5 to about 3% by weight of the acid. The zinc plated metal wool is generally immersed in the acid activator solution for from about 0.25 to about 2.0 minutes for activation and then applied to the spill of liquid elemental mercury.

While the zinc plated metal wool may be employed in the form of a pad, it is envisioned that such a zinc plated pad may, if desired, be attached to or mounted on a handle, such as an elongated pole to form a mop, or on a brush handle or the like to form a paint brush type pad and can then be employed in this form for cleanup of the spilled mercury.

Exemplary of the novel method of cleanup of a spill of liquid elemental mercury according to this invention, mention may be made of the following procedure. Usually following a mercury spill a majority of the mercury can be recovered by use of an aspiration device. After recovery of the bulk of the mercury in this manner a 7 × 17 inch (25 gram) zinc plated steel wool pad (No. 3 steel wool, American Steel Wool Mfg. Co.), plated with about 2.0% zinc, is immersed in a 1% by weight citric acid solution for about 30 seconds to activate the zinc plated wool pad and after removal of the pad from the activator solution the spilled mercury is contacted with the pad, for example, by simply brushing the pad across the surface contaminated with the elemental mercury. The liquid elemental mercury wets the zinc plated metal fibers and capillary action/amalgamation draws the elemental mercury into the pad. After all the liquid mercury has been taken up by the metal wood pad the used pad can be placed into any suitable waste disposal container and either disposed of in accordance with any applicable environmental disposal regulation or held for treatment to recover liquid elemental mercury according to known recovery procedures.

From the foregoing it will be seen that an article of manufacture and method have been provided which will allow easy physical removal of spilled liquid elemental mercury, reduces or eliminates zinc contamination in the spill area, that is operable on irregular and vertical surfaces and allows easier reclaiming of elemental mercury. Moreover, substantially less zinc than required by a composition of U.S. Pat. No. 3,975,298 need be employed to recover an identical amount of spilled mercury.

It will be understood that the embodiments discussed herein and the use for the embodiments are merely illustrative of the invention and that one skilled in the art can make suitable modifications thereof without departing from the spirit and intent of the invention.

What is claimed is:

1. Metal wool plated with 0.5% by weight or more of zinc.
2. The zinc plated metal wood of claim 1 wherein the metal wool is plated with from about 0.5% to about 10% by weight of zinc.
3. The zinc plated metal wool of claim 2 wherein the metal wool is a steel wool.
4. The zinc plated metal wool of claim 3 in the form of a pad mounted on a handle.
5. The zinc plated metal wool pad of claim 4 mounted on a brush handle.
6. The zinc plated metal wool pad of claim 4 mounted on an elongated pole handle.
7. A method for the collection and cleanup of spilled liquid elemental mercury comprising contacting said spilled mercury with zinc plated metal wool of claim 1 after activation of said zinc plated metal by immersion thereof in an acid activator solution of about 0.5 to about 3% by weight of acid.
8. The method of claim 7 wherein the acid in the activator solution is selected from the group consisting of citric acid and sulfamic acid.
9. The method of claim 8 wherein the zinc plated metal wool is a zinc plated steel wool plated with from about 0.5 to about 10% by weight zinc.

* * * * *

UNITED STATES PATENT AND TRADEMARK OFFICE
CERTIFICATE OF CORRECTION

PATENT NO. : 4,076,553
DATED : February 28, 1978
INVENTOR(S) : James W. Seidenberger It is certified that error appears in the above—identified patent and that said Letters Patent are hereby corrected as shown below:

Column 3, line 16, "wood" should read "wool".
Claim 2, column 4, line 9, "wood" should read "wool".

Signed and Sealed this

First Day of May 1979

[SEAL]

Attest:

RUTH C. MASON
*Attesting Officer*

DONALD W. BANNER
*Commissioner of Patents and Trademarks*